United States Patent
Kempf

(10) Patent No.: US 6,941,737 B2
(45) Date of Patent: Sep. 13, 2005

(54) SAFETY ARRANGEMENT OF A HARVESTING MACHINE

(75) Inventor: Bernd Kempf, Althornbach (DE)

(73) Assignee: Deere & Company, Moline, IL (US)

( * ) Notice: Subject to any disclaimer, the term of this patent is extended or adjusted under 35 U.S.C. 154(b) by 87 days.

(21) Appl. No.: 10/661,425

(22) Filed: Sep. 12, 2003

(65) Prior Publication Data

US 2005/0050872 A1 Mar. 10, 2005

(30) Foreign Application Priority Data

Sep. 19, 2002 (DE) .......................................... 102 43 527

(51) Int. Cl.⁷ .............................................. A01D 75/28
(52) U.S. Cl. ................................. 56/10.2 R; 56/16.4 R; 56/11.3
(58) Field of Search ......................... 56/10.2 J, 16.4 R, 56/11.3, 10.2 R, 500; 460/111, 112

(56) References Cited

U.S. PATENT DOCUMENTS

| | | | |
|---|---|---|---|
| 4,323,136 A | 4/1982 | Van der Lely et al. | 180/271 |
| 4,345,418 A | 8/1982 | Arizpe | 56/202 |
| 4,456,109 A | 6/1984 | Bottomley et al. | 192/18 |
| 4,974,711 A | 12/1990 | Peterson, Jr. et al. | 192/120 |
| 5,033,595 A * | 7/1991 | Pardee | 192/18 R |
| 6,247,296 B1 * | 6/2001 | Becker et al. | 56/11.2 |
| 6,393,813 B1 * | 5/2002 | Nowak | 56/10.2 J |
| 6,690,285 B2 * | 2/2004 | Schafer et al. | 340/684 |
| 6,739,439 B2 * | 5/2004 | Moeller | 192/18 R |

* cited by examiner

*Primary Examiner*—Meredith C. Petravick

(57) ABSTRACT

A forage harvester is equipped with a safety device which incorporates controls that monitor various operating conditions including an operator's presence and apply a brake for stopping any possible rotation of the cutting drum whenever an unsafe condition for the operator exists.

5 Claims, 2 Drawing Sheets

SAFETY ARRANGEMENT OF A HARVESTING MACHINE

FIELD OF THE INVENTION

The invention concerns a safety arrangement of a harvesting machine including a crop processing arrangement driven in rotation and whose rotation can be stopped by a brake.

BACKGROUND OF THE INVENTION

In self-propelled forage harvesters, the chopper drum, due to its rather large moment of inertia, has a relatively long run-down time after the drive has been turned off. In case an operator should rely on the chopper drum being stopped and open the protection arrangement of the chopper drum shortly after the drive is turned off in order to remove a crop jam or in order to clean the machine, the operator is thereby exposed to a high potential danger. It has been proposed that an alarm signal be given when the chopper drum is rotating in order to call the operator's attention to the fact that the chopper drum is still rotating. However, such alarm signals are given when the operator does not intend to obtain any access to the chopper drum, and therefore are sometimes regarded as disturbing. Furthermore, they do not remove the danger emanating from the chopper drum.

DD 219 651 A proposes a drive for chopper arrangements that includes a brake for the supply arrangement and the drive of the front attachment, which also acts upon the chopper arrangement. The brake is automatically actuated by a foreign object signaling arrangement. Hence, it is used only to protect the chopper drum against foreign object intrusion. It cannot counteract the danger originating from the chopper arrangement, when the operator turns off the drive, since then the chopper arrangement continues to rotate without any braking.

U.S. Pat. No. 4,974,711 A describes the control of the brake and the clutch of a lawn mower. In view of the considerably smaller moment of inertia of the knives of the lawn mower, anyone skilled in the art cannot see a reason for the use of this control for an agricultural harvesting machine of type described initially from this publication.

The problem underlying the invention is seen in the need to define a solution that makes possible an access without any danger to the operator after turning off the drive of a crop processing arrangement of a harvesting machine.

SUMMARY OF THE INVENTION

According to the present invention, there is provided an improved safety arrangement for permitting safe access to a cutting drum after the power to it has been cut off.

An object of the invention is to provide a brake for stopping the cutting drum whenever a condition is sensed where the brake should be applied.

It is proposed that the brake be coupled with a control arrangement that detects whether an operator safety condition has been fulfilled. Only when the operator safety condition has been fulfilled, which is the case when the conclusion can be reached that no danger to the operator can originate form the crop processing arrangement, then the control arrangement permits the release of the brake, otherwise the brake is in the applied position.

In this way, the result is that the crop processing arrangement is stopped by the brake as long as the operator safety condition is not fulfilled so that the risk of danger to the operator is reduced.

It is appropriate to insert a clutch between the crop processing arrangement and its drive, that is also controlled by a control arrangement detecting the operator safety condition. The control arrangement disengages the clutch when it applies the brake and engages the clutch when it releases the brake. The result is that the brake does not have to overcome the drive torque of the drive. The shift processes of clutch and brake can be performed synchronously or with a certain time delay.

The operator safety conditions can be considered as fulfilled when the operator is located at a position in which the operator is not endangered by the crop processing arrangement, for example, in an operator's cab, and when the operator has engaged the operation of the crop processing arrangement, since then the assumption can be made that the operator does not rely on the fact that the crop processing arrangement is at rest. Therefore, an obvious solution is to couple the control of the brake with the operating witch of the crop processing arrangement, in order to determine whether the operator intends an operation of the crop processing arrangement. Analogously, the control arrangement can be connected with an ignition switch, in particular, of a self-propelled harvesting machine or one controlling the movement of the carrier vehicle. Only when the ignition switch is turned on is a release of the brake useful. Alternatively, or in addition, a switch indicating the presence of an operator may be provided at the operating place of an operator, as a rule, in an operator's cab or an open operator's platform. The switch indicating the presence of an operator may, for example, be a seat switch that is actuated only when a load is applied to the operator's seat and is turned on only when the operator is located at this operating position. Only then does the control arrangement permit a release of the brake. If the operator stands up from his operating place, the brake is activated automatically and the crop processing arrangement is stopped, even though he has not turned off the crop processing arrangement and/or the ignition switch, so that the operator cannot injure himself.

The brake is preferably actuated hydraulically. In order to assure that the crop processing arrangement stops, for example, during an unintended drop in hydraulic pressure in the on-board hydraulic system or during the stopping of the drive engine, it is useful to pre-load the brake by a spring into its braking position and to release it hydraulically. Thereby, the brake reaches the braking position automatically when the hydraulic pressure drops.

In various harvesting machines, there is only very little space to accommodate the brake in the vicinity of the crop processing arrangement. In that way, in forage harvesters with chopper drums installed transverse to the direction of operation and in combines with thresher drums also arranged transverse to the direction of operation, there is barely space available alongside the crop processing arrangement, since the total width of the harvesting machines are fixed by the traffic regulations on public roads, and the crop processing arrangements occupy a large proportion of the width remaining between the wheels. Therefore, it has been shown to be advantageous to arrange the brake at a distance from the crop processing arrangement and to connect it through an appropriate drive connection.

Such a drive connection can be provided by a belt drive that can deflect under tension. In a preferred embodiment, the hydraulic cylinder providing the tension is connected with an accumulator, that assures the continuation of the drive connection even after a pressure drop in the pressure supply for a time interval sufficient to stop the crop processing arrangement. Such an accumulator can also be used for other separable drive connections, that represent a drive clutch, for example, hydraulically actuated disk clutches.

The safety arrangement according to the invention is appropriate for all harvesting machines in which crop processing arrangements are driven. Examples are thresher drums and thresher and/or separator rotors of combines, chopper drums of forage harvesters, cutting rotors of self-loading forage boxes, and balers.

The drawings show an embodiment of the invention that shall be described in greater detail in the following.

DESCRIPTION OF THE PREFERRED EMBODIMENT

Figure 1:
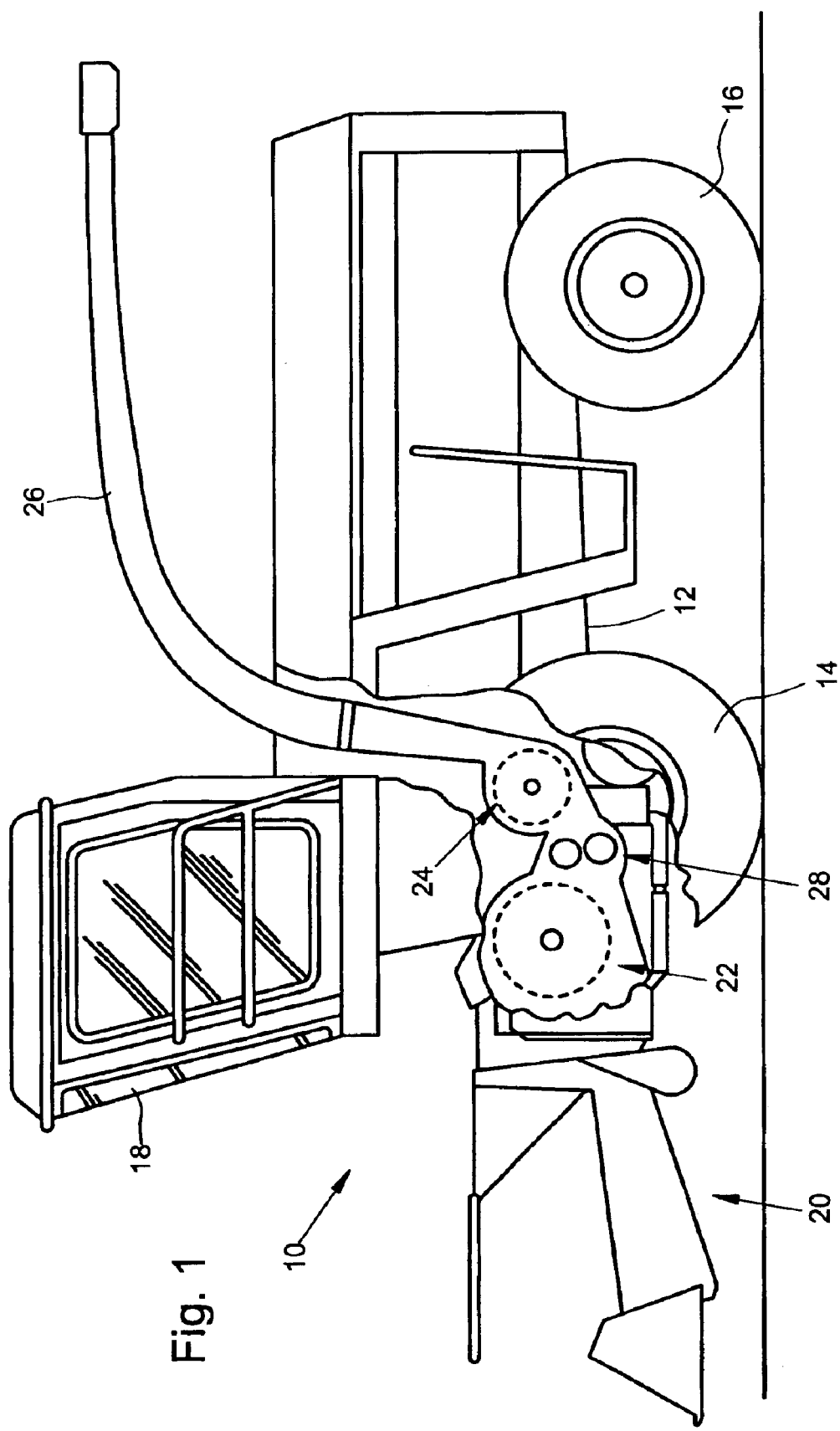
FIG. 1 is a schematic left side view of a harvesting machine.

FIG. 1 shows a harvesting machine 10 in the form of a self-propelled forage harvester. The forage harvester is supported on a frame 12, that is carried by front wheels 14 and steerable rear wheels 16. The forage harvester is controlled from an operator's cab 18 from which a crop take-up arrangement 20 can be viewed and controlled. Crop taken up from the ground by means of the crop take-up arrangement 20, such as corn, grass or the like are conducted over supply rolls that are arranged within an intake housing, to a chopper drum 22 that chops the crop into small pieces in the interaction with a shear bar and delivers the chopped crop to a conveyor or blower arrangement 24. The crop leaves the forage harvester to an accompanying transport vehicle or trailer through a discharge duct 26 that is mounted for rotating about an upright axis. A post chopper reduction arrangement or kernel processor 28 is located between the chopper drum 22 and the conveyor arrangement 24 throught which th crop to be conveyed is conducted tangentially to the conveyor arrangement 24.

Figure 2:
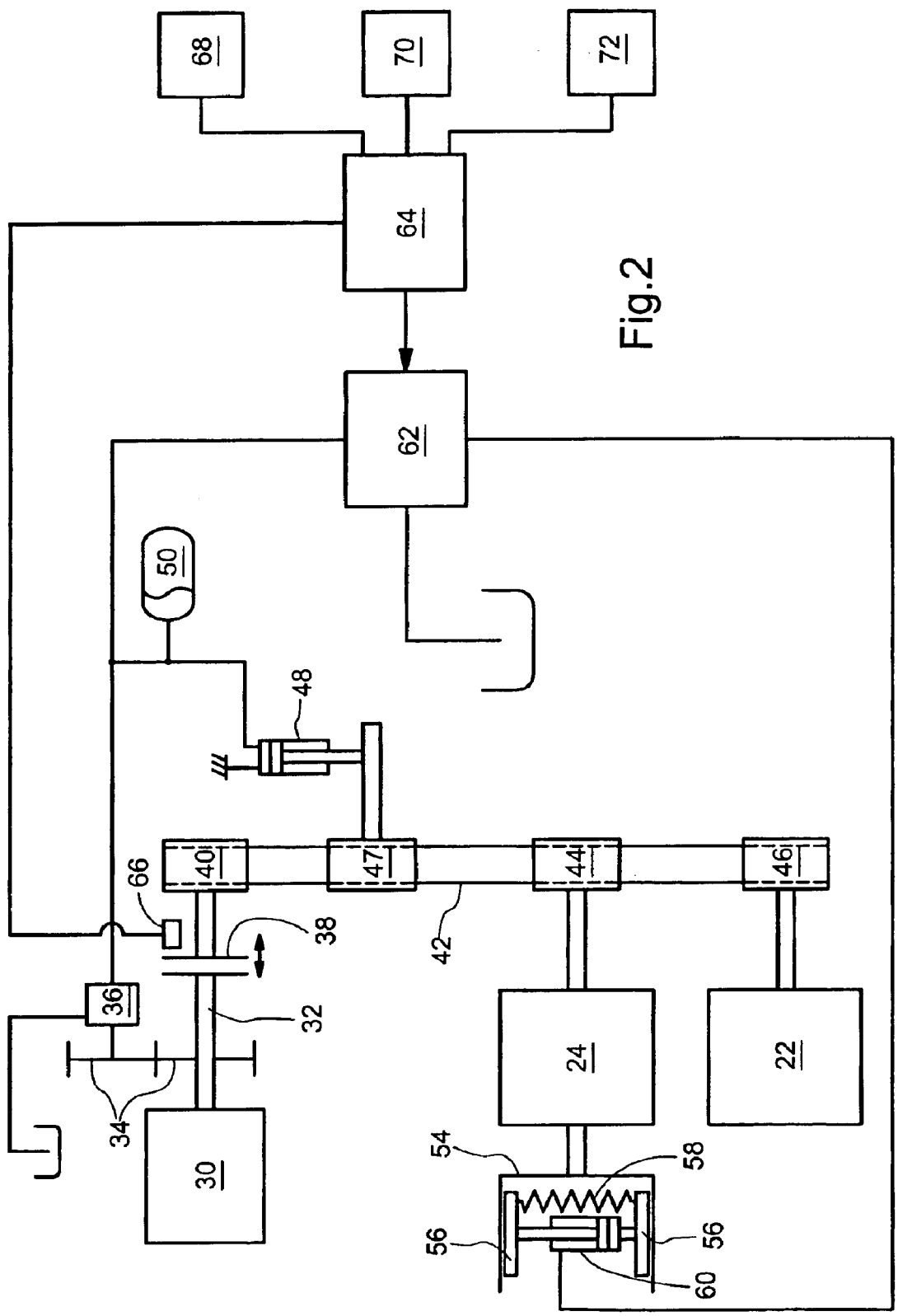
FIG. 2 is a schematic diagram showing the drive of the chopper drum and the safety arrangement of the harvesting machine.

FIG. 2 schematically shows the drive of the chopper drum 22. A drive engine 30, as a rule a Diesel engine or other internal combustion engine, provides drive energy that is required for the forward propulsion and the drive of the harvesting arrangements of the harvesting machine 10. The output shaft 32 of the drive engine 30 drives a hydraulic pump 36 over a gear pair 34. The hydraulic pump is used for the supply of the on-board hydraulics of the harvesting machine 10 with pressurized hydraulic fluid. This hydraulic pump or another hydraulic pump also generates the hydraulic flow for hydraulic forward propulsion motors that drive the wheels 14, 16. Furthermore, the output shaft 32 is connected so as to drive a belt pulley 40 over an electrically controlled clutch 38. The clutch 38 could also be shifted hydraulically. A drive belt 42 runs over the belt pulley 40 that furthermore interacts with belt pulleys 44 and 46. The belt pulley 44 is connected so as to drive the conveyor arrangement 24, while the belt pulley 46 is connected so as to drive the chopper drum 22. A tensioning pulley 47 can be brought into a position by a hydraulic cylinder 48 in which it applies tension to the drive belt 42 in such a way that it provides a drive connection between the belt pulleys 40, 44, and 46.

After starting the drive engine 30, the hydraulic pump 36 provides pressurized hydraulic fluid into the hydraulic system that actuates the hydraulic cylinder 48 in order to bring the tensioning pulley 47 into such a position that the drive belt 42 establishes the drive connection between the belt pulleys 40, 44, 46. The hydraulic cylinder 48 is buffered by the accumulator 50.

The chopper drum 22, as well as the conveyor arrangement 24 and the drive belt 42, represent a considerable potential for danger in their rotating condition ofr an operator that comes close to their operating region, in order, for example, to remove jams. To improve the operating safety of the operator, a safety arrangement is provided with a brake 52, a valve arrangement 62 and a control arrangement 64. The brake 52 is provided with a body 54 coupled to the conveyor arrangement 24 so as to transmit torque, and brake shoes 56 arranged within it. The brake shoes 56 are preloaded by a spring 58 into their braking position. A brake air cylinder 60 is arranged to draw the brake shoes 56 towards each other in order to draw them away from the body 54 and to release the brake 52. The attachment of the brake 52 on the shaft of the conveyor arrangement has the advantage that there is sufficient space available at this location, while in the region of the chopper drum 22 considerably less space remains, since it is wider than the conveyor arrangement 24.

The brake air cylinder 60 is connected so as to conduct hydraulic fluid with the valve arrangement 62, which for its part is connected with the hydraulic pump 36. The valve arrangement 62 can be actuated electromagnetically by the control arrangement 64 arranged to detect an operator safety condition. Furthermore, the control arrangement 64 is electrically connected with a control electromagnet 66 of the electrically controlled clutch 38. Input of the control arrangement 64 is connected with an ignition switch 68, a chopper drum operating switch 70 and an operator presence sensor 72. The ignition switch 68 is used to start the drive engine 30 and to stop it, and is coupled by connections known in themselves with the drive engine 30, not shown for the sake of clarity. The chopper drum operating switch 70 is arranged, as is the ignition switch 68, in the operator's cab 18 and is used to activate the harvesting and chopper operation, and to end it. The operator presence sensor 72 is arranged to detect whether the operator is located in the operator's cab 18. It can be configured in the form of a seat switch that detects the load on the seat. But the use of a light barrier, an infra-red sensor or a camera is also conceivable to determine whether or not the operator is located in the operator's cab 18.

The operation of the harvesting machine 10 with the safety arrangement proceeds as follows, where the initial assumption is that the drive engine 30 is stopped at first. If an operator in the operator's cab 18 actuates the ignition switch 68, the drive engine 30 is started. The hydraulic pump 36 provides a sufficient pressure in the on-board hydraulic system so that the hydraulic cylinder 48 brings the tensioning pulley 47 into its tensioning position. The drive belt 42 is thereby tensioned, as long as the drive engine 30 is running. Due to the action of the spring 58, the brake 52 is in the braking position. As long as the operator is located at the operating position in the operator's cab 18, so that the operator presence sensor 72 signals the control arrangement 64 that the operator is present, and if the operator activates the chopper drum operating switch 70, then the control arrangement 64 arranges for the valve arrangement 62 to apply hydraulic fluid, provided by the hydraulic pump 36, to the brake air cylinder 60. Therefore, the brake air cylinder 60 is loaded only when the ignition switch 68 and the chopper drum operating switch 70 are turned on and the operator presence sensing switch detects the operator at the operating station. When the brake air cylinder 60 draws the brake shoes 56 away from the body 54 of the brake 52, the body 54 can rotate freely. After that or simultaneously, the control arrangement 64 arranges for the control electromagnet 66 of the electrically shifted clutch 38 to engage the clutch 38, so that the chopper drum 22 and the conveyor arrangement 24 are brought into rotation by the drive belt 42. The conveying elements of the harvested crop take-up arrangement 20, that are to be driven, and the supply rolls, are driven mechanically by the chopper drum 22 in a manner known in itself and/or by separate hydraulic motors.

In case the operator now turns off the chopper drum operating switch, then the control arrangement 64 arranges for the control electromagnet 66 to disengage the clutch 38. Simultaneously or shortly thereafter, the control arrangement 64 arranges for the valve arrangement 62 to drain the pressure from the brake air cylinder 60. Thereby, the spring 58 presses the brake shoes 56 into the braking position and the brake retards the chopper drum 22 over the drive connection with the conveyor arrangement 24. In this way, the chopper drum 22 is stopped in a short time. If the operator has stopped the chopper drum 22 because he has discovered a crop jam or some other trouble, he can now investigate the chopper drum 22 and the other conveyor elements without encountering any danger. Analogously, the control arrangement 64 arranges for the clutch 38 to be disengaged and activates the brake 52 on the basis of the signal of the operator presence sensor 72 when the operator leaves the operator's cab 18, even though the chopper drum operating switch 70 is still turned on and the chopper drum accordingly still rotates. When the ignition switch 68 is turned off, the control arrangement 64 also arranges for the clutch 38 to be disengaged and the brake 52 to be applied. Furthermore, the hydraulic pressure of the hydraulic pump 36 then drops off, which leads to the fact that the pressure in the brake air cylinder 60 also drops off whereupon the spring 58 brings the brake 52 into the braking position. It should be noted that in the case that the operator is not present, as indicated by the sensor 72, the control arrangement 64 can generate an acoustic and/or optical alarm during the time interval in which the chopper drum 22 rotates or could rotate.

The accumulator 50 provides assurance that after turning off the ignition switch or when the drive engine 30 is stopped for other reasons, for example, due to overload or running out of fuel in the fuel tank and the resulting stoppage of the hydraulic pump 36, a sufficiently strong hydraulic pressure is applied to the hydraulic cylinder 48 for a sufficiently long time interval, so that the tensioning pulley 47 remains in its operating position and the drive connection between the chopper drum 22 and the brake 52 is maintained. It could be useful to provide appropriate stop valve, not shown in the drawing, between the accumulator 50 and the remaining elements of the on-board hydraulic system, so that in this case, the on-board hydraulic system does not absorb the pressure of the accumulator 50.

Having described the preferred embodiment, it will become apparent that various modifications can be made without departing from the scope of the invention as defined in the accompanying claims.

What is claimed is:

1. In combination with a harvesting machine including an engine, a crop processing arrangement mounted for being driven in rotation, a driveline coupled between said engine and said crop processing arrangement and containing a main drive clutch, a safety arrangement, comprising: a brake being mounted for being selectively applied for stopping rotation of said crop processing arrangement, a control arrangement including a sensor for detecting an operator safety condition; said control arrangement being coupled to said brake and being operable for controlling said brake in such a way that it applies a braking effect to stop rotation of said crop processing arrangement in response to receiving a signal from said sensor, which indicates that a safe condition for said operator does not exist; an operating switch connected to said control arrangement for selectively controlling said main clutch for selectively coupling said engine to said driveline for driving said crop processing arrangement; said sensor being an operator presence sensor located at an operator station; and an ignition switch for selectively turning the engine on and off also being connected to said control arrangement; said brake being spring-applied and hydraulically-released; an engine-driven pump coupled for supplying pressurized fluid to said brake, whereby said brake is automatically engaged upon a loss of pressure caused by turning off said engine.

2. The combination, as defined in claim 1, wherein said control arrangement is coupled to said main clutch for selectively effecting engagement and disengagement of said main clutch; and said control arrangement being operable for effecting disengagement of said main clutch approximately simultaneously with effecting engagement of said brake.

3. The combination, as defined in claim 1, wherein said brake is coupled to said driveline at a location spaced a considerable distance from said crop processing arrangement.

4. The combination, as defined in claim 2, wherein said harvesting machine includes a hydraulically engagable drive effecting arrangement associated with said driveline between said main clutch and said crop processing arrangement and operable for maintaining a drive connection between said main clutch and said crop processing arrangement only so long as a predetermined fluid pressure is present at said drive-effecting arrangement; and an accumulator coupled to said drive-effecting arrangement for maintaining said predetermined fluid pressure for maintaining said drive connection between said main clutch and said crop processing arrangement for a predetermined period of time after said engine is turned off, whereby a braking force of said brake is applied to said crop processing arrangement for said predetermined period of time after said engine is turned off.

5. The combination, as defined in claim 4, wherein said crop processing arrangement is a chopper drum.

* * * * *